May 28, 1957  J. D. LARSEN  2,793,512
SHIELD FOR DRIVE MECHANISMS
Filed Dec. 19, 1955
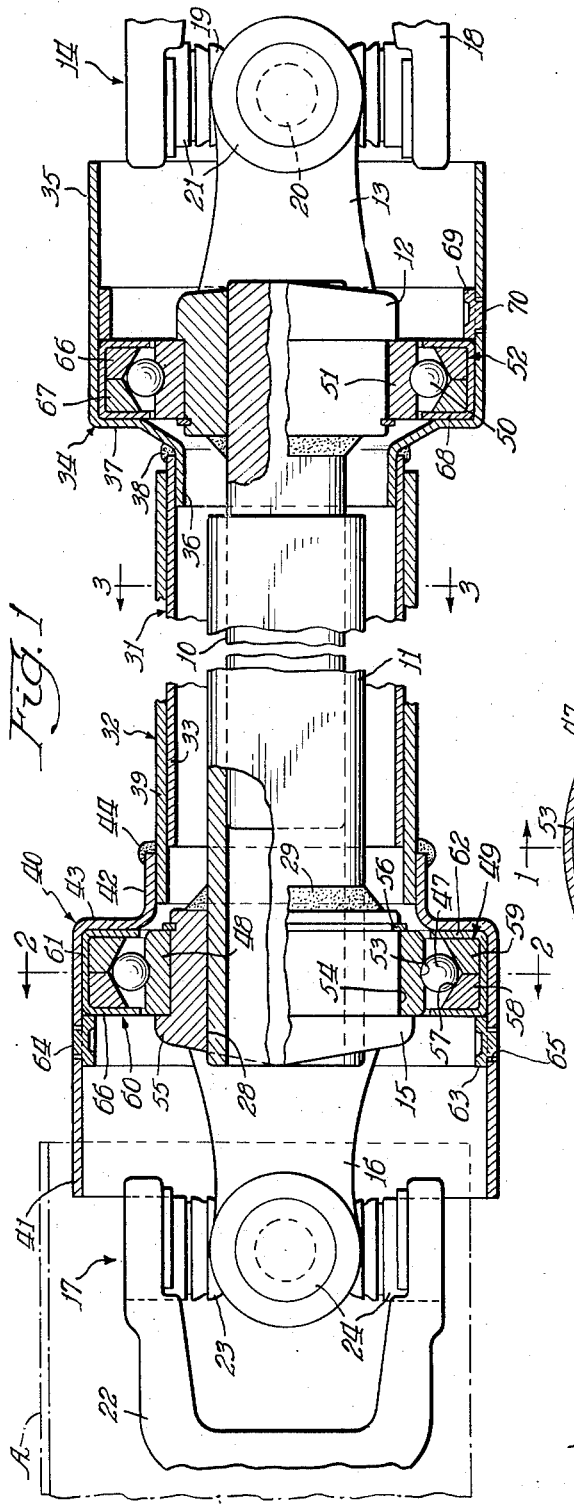
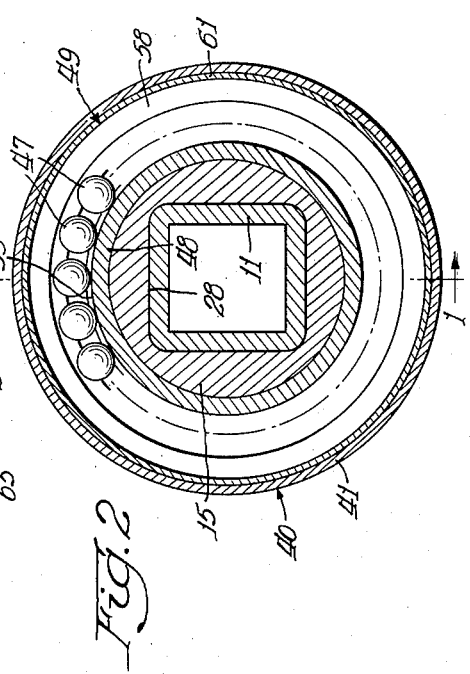
Inventor:
Jens D. Larsen
By: H. J. Schmid
Atty.

United States Patent Office 2,793,512
Patented May 28, 1957

2,793,512
SHIELD FOR DRIVE MECHANISMS

Jens D. Larsen, Rockford, Ill., assignor to Borg-Warner Corporation, Chicago, Ill., a corporation of Illinois Application December 19, 1955, Serial No. 553,761

4 Claims. (Cl. 64—4)

This invention relates to shields for drive mechanisms and more particularly to such shields for exposed rotating drive mechanisms to protect the operator from injury during operation thereof.

An object of the invention is to provide an improved shield for drive mechanisms to protect the operator when the drive mechanisms are in operation.

Another object of the invention is to provide an improved shield for assemblies of universal joints and shafts, and in which the shafts may be telescoped for relative axial movement in operation.

Another object of the invention is to provide improved shields for drive mechanisms embodying universal joints and which encloses the drive mechanisms in a manner affording adequate protection of the operator during operation thereof.

A further object of the invention is to provide an improved shield for drive mechanisms which shield can be readily assembled with the drive mechanisms, and can be readily removed from the drive mechanisms for servicing the shields or drive mechanisms, by the operator.

A further object of the invention is to provide improved shields for drive mechanisms which are economical to manufacture; easily and quickly mounted and fastened in position for use, and readily removed; durable; and affords maximum protection of the operator.

Other objects and advantages of the invention will become apparent from the following specification taken together with the accompanying drawing, in which:

Fig. 1 is a longitudinal sectional view of a drive mechanism with telescoping shafts, the mechanism having applied thereto a shield constructed according to the present invention, said section being taken on line 1—1 of Fig. 2;

Fig. 2 is a cross-sectional view taken substantially along the line 2—2 of Fig. 1.

Fig. 3 is a cross-sectional view taken substantially on line 3—3 of Fig. 1.

Referring to Fig. 1, as an example of one form in which the invention may be embodied, there is shown a drive mechanism comprising a pair of torque-transmitting members or telescoping axially aligned shafts 10 and 11, the solid shaft 10 being positioned within the sleeve shaft 11 and connected to the hub 12 of a yoke 13 of a universal joint indicated at 14, and the sleeve shaft 11 being connected to the hub 15 of a yoke 16 of a universal joint 17. The universal joint 14 comprises the yoke 12 and a yoke 18 connected by an intermediate transmission member of spider 19 having four trunnions 20 ninety degrees apart and received within bearing cups 21 held by the arms of the yokes. The universal joint 17 is identical to the joint 14, comprising the yoke 16, yoke 22, spider 23 and bearing cups 24.

The solid shaft 10 is rectangular in cross section, as seen in Fig. 2 and has one end extending within the similarly shaped opening in the hub 12 of the yoke 13, the shaft 10 being received within a rectangular opening in the hub 12 and the shaft to hub 12. The sleeve shaft 11 is also rectangular in cross-section for receiving the shaft 10, and has one end extending within the similarly shaped opening 28 in the hub 15 of the yoke 16, the shaft 11 being secured to the hub 16 by a weld 29 connecting the shaft to the hub 16. The shaft 11 is spaced from the yoke 13 and the shaft 10 can move in the sleeve shaft 11 as shown to permit relative axial movement of the shafts 10 and 11 during operation of the drive mechanism. It will be apparent that rotation of the yoke 22 will cause rotation of the yoke 16, the sleeve shaft 11 and the shaft 10, and the joint 14, the driving connection between the shafts 10 and 11 allowing relative axial displacement between the shafts occasioned by relative bodily displacement between the universal joints 14 and 17 as required in certain applications including equipment used in agricultural implement fields.

The present invention is directed to providing a shield or guard to cover the drive mechanism to adequately protect the operator while the mechanism is in operation, and which may be readily assembled with the drive mechanism and easily removed by the operator for servicing the guard or the drive mechanism.

The shield of the present invention comprises a plurality of telescoping tubes 31 and 32 of sheet metal and supported on the yokes 13 and 16 respectively, and enclosing shafts 10 and 11 and the major portions of the joints 14 and 17. More particularly, the tube 31 has a cylindrical portion 33 surrounding the shafts 10 and 11 and provided at one end with an annular collar portion 34 surrounding the yoke 13 and parts of the yoke 13 and spider 19, the collar portion having spaced cylindrical walls 35 and 36 of different diameters connected by a radially extending wall 37. The cylindrical wall 36 of the collar portion 34 of the tube 31 surrounds and engages the end of the cylindrical portion 33 of the tube 31 and is secured thereto by a weld 38. The tube 32 is of greater diameter than the tube 31 and has a cylindrical portion 39 surrounding and in telescoping engaging relation to the cylindrical portion 33 of the tube 31 and having at one end an annular collar portion 40 enveloping the yoke 16 and parts of the yoke 22 and spider 23. The collar portion 40 has spaced cylindrical walls 41 and 42 of different diameters connected by a radially extending wall 43, the cylindrical wall 42 surrounding and engaging one end of the cylindrical portion 39 of the tube 32 and being fixed thereto by a weld 44.

The tubes 31 and 32 are supported and rotate with the shafts but may be stopped or rotate relative to the shafts if the operator of a tractor and a farm implement, such as a mower, should fall or step on the shield during transmission of power and rotation by the shafts, the tractor and mower being connected to each other by a separate hitch (not shown) pivotally connecting the same and which may be of the ball and socket type to permit the tractor to pull the mower during operation and allow relative axial movement of the shafts 11 and 10 which are respectively connected to the tractor and the mower. As seen in Fig. 1, the tractor is customarily provided with a guard A fixed thereto overlying the yoke 22.

To permit rotation of the shafts 10 and 11 relative to the tubes 31 and 32 and axial movement of the tubes 31 and 32 with the shafts 10 and 11, ball bearings 47 and radially inner and outer annular races 48 and 49 are disposed between the yoke 16 and the tube 32 and ball bearings 50 and races 51 and 52 are positioned between the yoke 13 and tube 31.

More particularly, ball bearings 47 are positioned equidistantly circumferentially of the hub 15 of the yoke 16 by an annular groove 53 in the race 48 and which race 48 surrounds and has its inner cylindrical surface engaging a radially outer cylindrical surface 54 on the yoke hub 15. The race 48 may be press-fitted on the yoke hub 15 to prevent relative rotation between the race 52 and yoke 15. The yoke hub 15 has a flange 55, at one end of the surface 54 thereof, engaging one edge of the race 48 and a groove in the surface 54 thereof, receiving a split snap ring 56, to prevent relative axial movement of the yoke 15 and race 48. The ball bearings 47 extend within an annular V-shaped groove or raceway 57 in the race 49 formed by two rings 58 and 59 having surfaces converging radially outwardly of the axis of the tube 32 and retained in assembly by a U-section ring 60 receiving the rings 58 and 59. The ring 60 has a cylindrical wall 61 seated against and in complementary engagement with the inner surface of the cylindrical wall 41 of the collar portion 34 of the tube 31, the radially extending wall 62 of the ring 60 engaging the radial wall 43 of the collar portion 40 of the tube 31. An annular split retainer 63, received within and engaging the collar portion 34, has a plurality of circumferentially spaced and radially outwardly extending projections or bosses 64 are positioned within spaced openings 65 in the collar portion 34, and one end of the retainer 63 abuts the radially extending wall 66 of the ring 60 to maintain the ring 60 in engagement with the wall 43 of the collar portion 34 and thereby to prevent axial movement of the race 49 relative to the collar portion 34 of the tube 32.

The tube 31 is connected to the hub 12 of the yoke 13 by ball bearing structure identical to the structure previously described for movement axially therewith and relative to the tube 32 and for rotation of the yoke 13 and shaft 10 relative to the tube 31. The ball bearings 50 are disposed within an annular groove in the race 51 and engaging the radially outwardly converging surfaces of the rings 66, 67 forming the race 52, the rings 66, 67 being positioned within the U-section annular holder 68 held against axial movement relative to the collar portion 34 of the tube 33 by the retainer ring 69 engaging the holder 68 and positioning the holder 68 in engagement with the radial wall 37 of the collar portion by the bosses 70 on the ring 69 seated in openings in the cylindrical wall 35 of the collar portion 34 of the tube 33.

It will be apparent from the description that the tubes 31 and 32 may move relative to each other in an axial direction to conform to the relative axial adjustment of the shafts 10 and 11 and during the conjoint rotation of the shafts 10 and 11 to afford a shield protective of the operator of the machines to which the shafts are attached as the tubes 31 and 32 can move in an axial direction and are capable of rotary movement due to their respective connections to the shafts, and can also be prevented from rotating with the shafts.

An important feature of the invention is the ready and simple assembly of the shield to the drive mechanism at each end of the drive mechanism as the inner and outer races, ball bearings and the retainer or holder for the outer race may be assembled as a unit, and the units slipped over the solid shaft 34 and sleeve shaft 33 and positioned on the yokes in abutment with the radially outer flanges on the yokes and the snap rings then positioned in the grooves in the yokes. Each of these individual bearing, yoke and shaft assemblies may then be received in their respective tubes 33 and 34 and the retainers or holders 63 and 69 inserted in the open ends of the tubes while the holders are contracted to be received within the tubes and then allowed to expand to seat the bosses thereon into the openings in the collar portions of the tubes to assemble the shafts with the tubes. The bearing assemblies may be removed from or replaced on the yokes by removing the snap rings disposed in the grooves in the yokes.

The assembly of the shafts, joints and shield may be easily serviced for repairs or replacement by merely removing the bearing assembly retainers or holders 63 and 69, contracting the retainers to remove the same from the shield tubes, the contraction of the holders causing the bosses thereof to be moved radially inwardly of the tubes and the ends of the split retainers toward each other for readily removing the retainers from the tubes, each shield tube and its associated shaft then being movable axially of each other to separate and disassemble the same.

While I have described my invention in connection with a specific embodiment thereof, it is to be understood that this is by way of illustration and not by way of limitation and the scope of my invention is defined solely by the appended claims which should be construed as broadly as the prior art will permit.

I claim:

1. In combination, a shaft assembly including telescoping coaxially adjustable and conjointly rotatable shafts; universal joints at opposite ends of said assembly and including first and second members respectively connected to said shafts, each member having an outer surface defined by a pair of axially spaced abutments; a shield surrounding said shafts and said universal joints and including telescoping elements, each of said elements comprising a tubular portion surrounding said shafts, a cylindrical portion at one end of each of said tubular portions and said elements each including inwardly opening retainer engaging portions and axially facing abutments spaced therefrom, one of said cylindrical portions surrounding one of said members and the other of said cylindrical portions surrounding the other of said members; bearing assemblies respectively disposed between and engaging said members and said cylindrical portions of said elements, each bearing assembly being respectively disposed between said spaced abutments and thereby being restrained from axial movement with respect to said members, each bearing assembly further being respectively disposed in abutment with the axially facing abutments of said telescoping elements, and annular retainers within said cylindrical portions of said elements and engaging the edges of said bearing assemblies opposite the axially facing abutments and having projections received within said retainer engaging portions in said elements for restraining the bearing assemblies from axial movement with respect to the telescoping elements.

2. In combination, a shaft assembly including telescoping coaxially adjustable and conjointly rotatable shafts; universal joints at opposite ends of said assembly and including first and second members respectively connected to said shafts; a shield surrounding said shafts and said universal joints and including telescoping elements, each of said elements comprising a tubular portion surrounding said shafts, a cylindrical portion at one end of each of said tubular portions terminating at one end with an inwardly extending abutment and said elements having inwardly opening engaging portions axially spaced from said abutments, one of said cylindrical portions surrounding one of said members and the other of said cylindrical portions surrounding the other of said members; bearing assemblies between and engaging said members and said cylindrical portions of said elements, each bearing assembly comprising bearings and being respectively seated against the engaged cylindrical portion and member and having one edge thereof abutting the inwardly extending abutment adjacent the engaged cylindrical portion; and annular retainers within said cylindrical portions of said elements and engaging the other edges of said bearing assemblies and having projections received within said inwardly opening engaging portions in said elements.

3. In combination, a shaft assembly including telescoping coaxially adjustable and conjointly rotatable driving and driven shafts; universal joints at opposite ends of said assembly and including members respectively connected to said shafts; a shield surrounding said shafts and universal joints and including telescoping tubular elements, a cylindrical portion of one of said elements surrounding one member and a cylindrical portion of the other of said elements surrounding the other member, said portions each having abutments and inwardly opening engaging portions in axially spaced relation; bearing assemblies between and engaging each member and the cylindrical portion surrounding the same for rotation of said shaft and universal joints relative to said elements, each bearing assembly being disposed between the abutments and inwardly opening engaging portions of the engaged cylindrical portion; and rings within said cylindrical portions and having projections within said inwardly opening engaging portions and cooperating with said abutments to prevent axial movement of said bearing assemblies relative to the cylindrical portion and member engaged therewith.

4. A structure as defined in claim 3 wherein each member is provided with a radially extending surface and a groove axially spaced therefrom, with the bearing assembly engaging the member having one end thereof seated against said surface thereof, and snap rings disposed within said grooves and cooperating with said surfaces to prevent movement of the bearing assemblies axially of said members.

References Cited in the file of this patent

UNITED STATES PATENTS

| | | |
|---|---|---|
| 1,024,132 | Heaslet | Apr. 23, 1912 |
| 2,696,089 | Heth | Dec. 7, 1954 |
| 2,735,281 | Hubert et al. | Feb. 21, 1956 |